(12) United States Patent
Tokimitsu et al.

(10) Patent No.: US 10,976,677 B2
(45) Date of Patent: Apr. 13, 2021

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Ryoichi Tokimitsu, Kashiwa (JP); Koichi Nakata, Tokyo (JP); Haruki Mori, Ichikawa (JP); Shubun Kujirai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/711,974

(22) Filed: Dec. 12, 2019

(65) Prior Publication Data
US 2020/0201200 A1   Jun. 25, 2020

(30) Foreign Application Priority Data
Dec. 21, 2018   (JP) .............................. JP2018-240171

(51) Int. Cl.
*G03G 5/07*   (2006.01)
*C08F 220/36*   (2006.01)
*C08F 220/28*   (2006.01)

(52) U.S. Cl.
CPC ........... *G03G 5/072* (2020.05); *G03G 5/0764* (2020.05); *C08F 220/28* (2013.01); *C08F 220/282* (2020.02); *C08F 220/36* (2013.01)

(58) Field of Classification Search
CPC ........ G03G 5/071; G03G 5/072; G03G 5/076; G03G 5/0764
See application file for complete search history.

(56) References Cited

U.S. PATENT DOCUMENTS 3,779,750 A * 12/1973 Merrill .................... C08F 16/06
430/73
7,186,489 B2   3/2007 Uematsu et al.
(Continued)

FOREIGN PATENT DOCUMENTS

JP   H07-072640   3/1995
JP   2000-066425   3/2000
(Continued)

OTHER PUBLICATIONS

English language machine translation of JP 2007-147986. (Year: 2007).*
(Continued)

*Primary Examiner* — Christopher D Rodee
(74) *Attorney, Agent, or Firm* — Venable LLP

(57) ABSTRACT

The present disclosure provides an electrophotographic photosensitive member that has mechanical durability, and can achieve both of suppression of an image flow and adequate electrical characteristics. In the electrophotographic photosensitive member having a support and a photosensitive layer provided on the support, a surface layer of the electrophotographic photosensitive member contains a copolymerized product of a composition containing a hole transporting compound represented by the following formula (1) and a compound represented by the following formula (3):

(1)

(Continued)

-continued

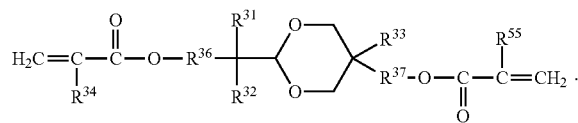

(3)

9 Claims, 2 Drawing Sheets

(56) References Cited

U.S. PATENT DOCUMENTS

| | | | |
|---|---|---|---|
| 7,226,711 B2 | 6/2007 | Amamiya et al. | |
| 7,534,534 B2 | 5/2009 | Nakata et al. | |
| 8,673,526 B2 * | 3/2014 | Sonobe | G03G 5/0614 430/66 |
| 9,316,931 B2 | 4/2016 | Takagi et al. | |
| 9,389,523 B2 | 7/2016 | Nakata et al. | |
| 9,594,318 B2 | 3/2017 | Nakata et al. | |
| 9,740,117 B2 | 8/2017 | Kosaka et al. | |
| 9,811,012 B2 | 11/2017 | Murakami et al. | |
| 9,983,490 B2 | 5/2018 | Shimada et al. | |
| 10,042,272 B2 | 8/2018 | Mori et al. | |
| 10,120,331 B2 | 11/2018 | Nakata et al. | |
| 10,310,395 B2 | 6/2019 | Nakata et al. | |
| 10,365,569 B2 | 7/2019 | Tokimitsu et al. | |
| 10,451,984 B2 | 10/2019 | Mori et al. | |
| 10,488,769 B2 | 11/2019 | Nakata et al. | |
| 10,488,771 B2 | 11/2019 | Mori et al. | |
| 10,558,132 B2 | 2/2020 | Ishiduka et al. | |
| 10,558,133 B2 | 2/2020 | Nakamura et al. | |
| 2014/0004450 A1 | 1/2014 | Tokimitsu et al. | |
| 2015/0168908 A1 * | 6/2015 | Black | G03G 5/14791 430/56 |
| 2015/0185631 A1 * | 7/2015 | Black | G03G 5/0614 430/58.3 |
| 2018/0335708 A1 | 11/2018 | Nakata et al. | |
| 2019/0361365 A1 | 11/2019 | Mori et al. | |
| 2019/0369514 A1 | 12/2019 | Watanabe et al. | |
| 2019/0391504 A1 * | 12/2019 | Nakata | G03G 5/14786 |
| 2020/0218171 A1 * | 7/2020 | Takeuchi | G03G 5/071 |

FOREIGN PATENT DOCUMENTS

| | | |
|---|---|---|
| JP | 2003-098708 | 4/2003 |
| JP | 2007147986 A * | 6/2007 |
| JP | 2009-134002 | 6/2009 |
| JP | 2009134002 A * | 6/2009 |
| JP | 2012-185419 | 9/2012 |

OTHER PUBLICATIONS

English language machine translation of JP 2009-134002. (Year: 2009).*
U.S. Appl. No. 16/673,485, Haruki Mori, filed Nov. 4, 2019.
U.S. Appl. No. 16/731,150, Eileen Takeuchi, filed Dec. 31, 2019.
U.S. Appl. No. 16/777,173, Koichi Nakata, filed Jan. 30, 2020.

* cited by examiner

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present disclosure relates to an electrophotographic photosensitive member, a process cartridge having the electrophotographic photosensitive member, and an electrophotographic apparatus.

Description of the Related Art

An electrophotographic photosensitive member to be mounted on an electrophotographic apparatus includes an organic electrophotographic photosensitive member (hereinafter, referred to as "electrophotographic photosensitive member") containing an organic photoconductive material (charge generation material), and such an electrophotographic photosensitive member has been heretofore widely studied. In recent years, for the purpose of extending the life and enhancing an image quality of the electrophotographic photosensitive member, the electrophotographic photosensitive member is required to have mechanical durability (abrasion resistance) and show less fluctuation in electrical characteristics, which occurs due to long-term service.

Japanese Patent Application Laid-Open No. 2000-066425 describes a method for improving the mechanical durability of the electrophotographic photosensitive member and stabilizing the electrical characteristics, by imparting a polymerized product obtained by polymerizing a charge transporting substance which has a polymerizable functional group, to the outermost surface layer of the electrophotographic photosensitive member.

On the other hand, it becomes difficult for the surface of the electrophotographic photosensitive member to be refreshed, as the abrasion resistance of the electrophotographic photosensitive member becomes high, and accordingly a material which constitutes the surface of the electrophotographic photosensitive member deteriorates by discharge, by a charging process involving the discharge. As a result, it becomes easy for polar groups to increase because of the cleavage or oxidation of molecular chains on the surface of the electrophotographic photosensitive member. In addition, nitrogen oxides and ozone are generated by the charging process involving the discharge. In high-temperature and high-humidity environments, the cleavage products of these molecular chains, the polar groups, the nitrogen oxides and the ozone dissolve in a large amount of water content in the surface layer, the resistance of the surface of the electrophotographic photosensitive member decreases, and it becomes easy for electric charges to move on the outermost surface of the electrophotographic photosensitive member. As a result, the electrostatic latent image becomes blurred, and an image flow that is a phenomenon in which the output image is blurred tends to easily occur.

SUMMARY OF THE INVENTION

The above object is achieved by the following present disclosure. Specifically, the electrophotographic photosensitive member according to the present disclosure is an electrophotographic photosensitive member including a support, and a photosensitive layer provided on the support, wherein a surface layer of the electrophotographic photosensitive member includes a copolymerized product of a composition containing a hole transporting compound represented by the following formula (1) and a compound represented by the following formula (3):

(1)

wherein $Ar^{11}$ to $Ar^{13}$ each independently represent a substituted or unsubstituted phenyl group, or a substituted or unsubstituted biphenyl group, at least one of $Ar^{11}$ to $Ar^{13}$ is a substituted or unsubstituted biphenyl group, at least one of $Ar^{11}$ to $Ar^{13}$ has a substituent represented by the following formula (2), and the substituent of the substituted phenyl group and the substituted biphenyl group is an alkyl group, an alkoxy group, or a group represented by the following formula (2):

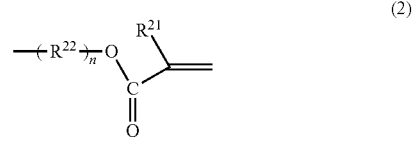

(2)

wherein $R^{21}$ represents a hydrogen atom or a methyl group, $R^{22}$ represents an alkylene group having 1 to 6 carbon atoms, and n represents 0 or 1; and

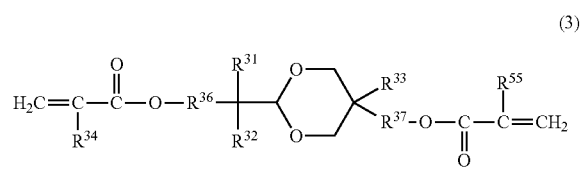

(3)

wherein $R^{31}$ and $R^{32}$ each independently represent an alkyl group having 1 to 4 carbon atoms, $R^{31}$ and $R^{32}$ may be bonded with each other to form a ring, $R^{33}$ represents an alkyl group having 1 to 4 carbon atoms, $R^{34}$ and $R^{35}$ each independently represent a hydrogen atom or a methyl group, and $R^{36}$ and $R^{37}$ each independently represent an alkylene group having 1 to 4 carbon atoms.

In addition, the present disclosure is to provide a process cartridge which integrally supports the electrophotographic photosensitive member, and at least one unit selected from the group consisting of a charging unit, a developing unit, a transfer unit and a cleaning unit, and which is detachably attachable to a main body of an electrophotographic apparatus.

In addition, the present disclosure is to provide an electrophotographic apparatus having the electrophotographic photosensitive member, the charging unit, the exposure unit, the developing unit and the transfer unit.

Further features of the present disclosure will become apparent from the following description of exemplary embodiments with reference to the attached drawings.

DESCRIPTION OF THE EMBODIMENTS

Figure 1:
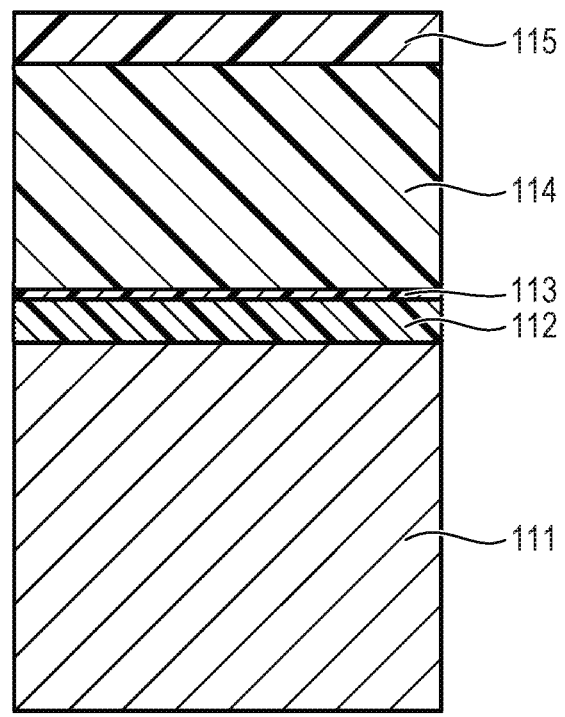
FIG. 1 illustrates a view illustrating one example of a layer configuration of the electrophotographic photosensitive member of the present disclosure.

Preferred embodiments of the present disclosure will now be described in detail in accordance with the accompanying drawings.

Among charge transporting substances having a polymerizable functional group, substances containing an amine compound having a biphenyl moiety are excellent in charge transporting properties because of having a long conjugation length because benzene rings are combined to each other, and provide particularly adequate electrical characteristics. However, because the conjugation length is long, polar groups tend to easily increase due to the cleavage and oxidation of the molecular chain, and the image flow tends to easily occur.

According to the study of the present inventors, the electrophotographic photosensitive member described in Japanese Patent Application Laid-Open No. 2000-066425 has mechanical durability and can provide adequate electrical characteristics, but is insufficient in suppressing the image flow.

Accordingly, an object of the present disclosure is to provide an electrophotographic photosensitive member that has a support and a photosensitive layer formed on the support, has also the mechanical durability, and can achieve both of the suppression of the image flow and the adequate electrical characteristics. In addition, another object of the present disclosure is to provide a process cartridge and an electrophotographic apparatus which have the electrophotographic photosensitive member.

Hereinafter, the present disclosure will be described in detail with reference to preferable embodiments.

In the present disclosure, as described above, in the electrophotographic photosensitive member having the support and the photosensitive layer provided on the support, the surface layer of the electrophotographic photosensitive member contains a copolymerized product of a composition containing a hole transporting compound represented by the following formula (1) and a compound represented by the following formula (3):

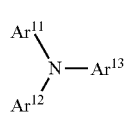
(1)

wherein $Ar^{11}$ to $Ar^{13}$ each independently represent a substituted or unsubstituted phenyl group, or a substituted or unsubstituted biphenyl group, at least one of $Ar^{11}$ to $Ar^{13}$ is a substituted or unsubstituted biphenyl group, at least one of $Ar^{11}$ to $Ar^{13}$ has a substituent represented by the following formula (2), and the substituent of the substituted phenyl group and the substituted biphenyl group is an alkyl group, an alkoxy group, or a group represented by the following formula (2):

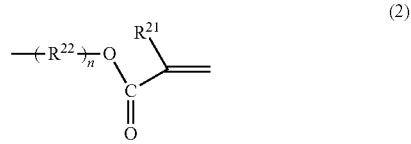
(2)

wherein $R^{21}$ represents a hydrogen atom or a methyl group, $R^{22}$ represents an alkylene group having 1 to 6 carbon atoms, and n represents 0 or 1; and

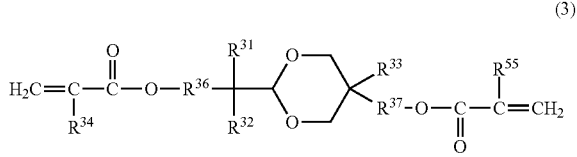
(3)

wherein $R^{31}$ and $R^{32}$ each independently represent an alkyl group having 1 to 4 carbon atoms, $R^{31}$ and $R^{32}$ may be bonded with each other to form a ring, $R^{33}$ represents an alkyl group having 1 to 4 carbon atoms, $R^{34}$ and $R^{35}$ each independently represent a hydrogen atom or a methyl group, and $R^{36}$ and $R^{37}$ each independently represent an alkylene group having 1 to 4 carbon atoms.

The present inventors assume the reason why the electrophotographic photosensitive member having a specific configuration according to the present disclosure can suppress the image flow without impairing the mechanical durability and the adequate electrical characteristics, in the following way.

The compound represented by the formula (3) has a moderately small molecular weight and has a cyclic structure having polarity. Because of this, the compound represented by the formula (3) is excellent in compatibility with the compound represented by the formula (1) that has a nitrogen atom having polarity and further has a benzene ring which is a cyclic structure. Because of this, the copolymerized product of the compound represented by the formula (1) with the compound represented by the formula (3) is more improved in the denseness of the film of the surface layer than the copolymerized product consisting only of the compound represented by the formula (1). Thereby, permeation of water content to the surface layer is suppressed, thereby the water content in the surface layer becomes small, and the dissolution of the substance into water is reduced, which causes the image flow. It is considered that thereby the reduction of the resistance of the surface layer is suppressed and the image flow is suppressed.

Specific examples of the compounds represented by the formula (1) and the formula (3) of the present disclosure will be shown below, but the present disclosure is not limited to the examples.

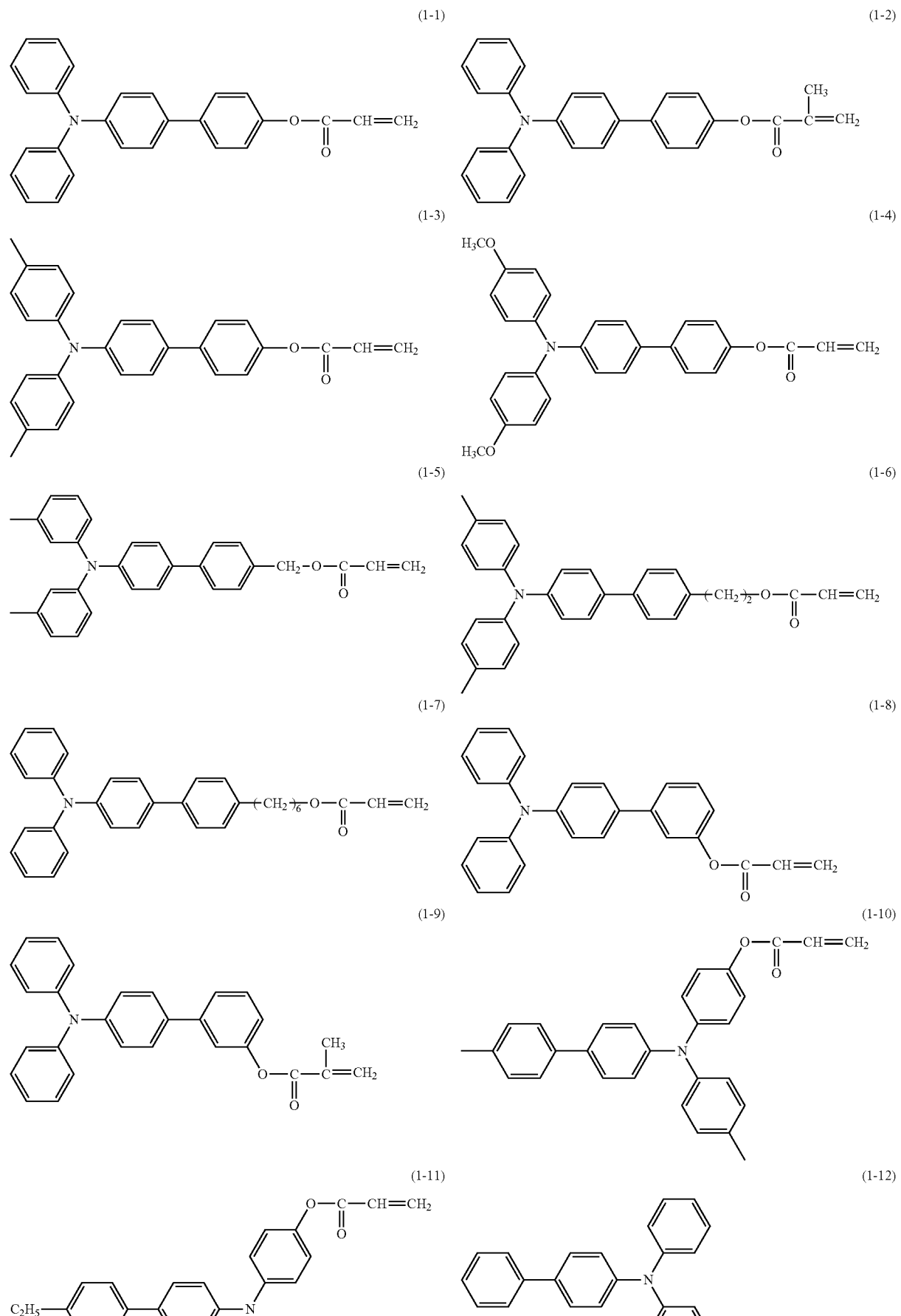

In the compound represented by the formula (3), it is preferable that $R^{36}$ and $R^{37}$ are a methylene group or an ethylene group, from the viewpoints of the denseness of the film and a strength of the film. Furthermore, it is preferable for suppressing the image flow that $R^{31}$ and $R^{32}$ are a methyl group. This is considered to be because when the substituent is a small methyl group, the steric repulsion among molecules in the film decreases, the denseness of the film increases, thereby the solubility of a substance deteriorated by discharge into water further decreases, and the image flow is suppressed.

It is preferable that a content by mass of the compound represented by the formula (3) in the composition is 0.1 times or more and 1.0 time or less with respect to a content by mass of the hole transporting compound represented by the formula (1), from the viewpoint of the adequate electrical characteristics.

It is further preferable that the surface layer of the electrophotographic photosensitive member contains a compound represented by the following formula (4), from the viewpoint of suppressing the image flow. The present inventors assume the reason in the following way. The compound represented by the formula (4) has a structure close to that of the compound represented by the formula (1), and tends to easily conform to the formula (1). In addition, the compound represented by the formula (4) has a group represented by the formula (2) or the following formula (5), and accordingly has an alkylene group and an oxygen atom; and accordingly tends to easily conform also to the compound represented by the formula (3). Therefore, it becomes easy for the compounds represented by the formula (1) and the formula (3) to alternately copolymerize via the compound represented by the formula (4). It is considered to be because the compound represented by the formula (3) thereby tends to be easily distributed uniformly in the film, and the denseness of the film further increases.

(In the formula (4), $Ar^{41}$ to $Ar^{43}$ each independently represent a substituted or unsubstituted phenyl group, or a substituted or unsubstituted biphenyl group. At least one of $Ar^{41}$ to $Ar^{43}$ is a substituted or unsubstituted biphenyl group. At least one of $Ar^{41}$ to $Ar^{43}$ has a substituent represented by the following formula (5). The substituent of the substituted phenyl group and the substituted biphenyl group is an alkyl group, an alkoxy group, a group represented by the formula (2), or a group represented by the following formula (5).)

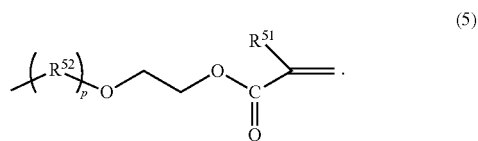

(In the formula (5), $R^{51}$ represents a hydrogen atom or a methyl group, and $R^{52}$ represents an alkylene group having 1 to 6 carbon atoms; and p represents 0 or 1.)

Specific examples of the compound represented by the formula (4) of the present disclosure will be shown below, but the present disclosure is not limited thereto.

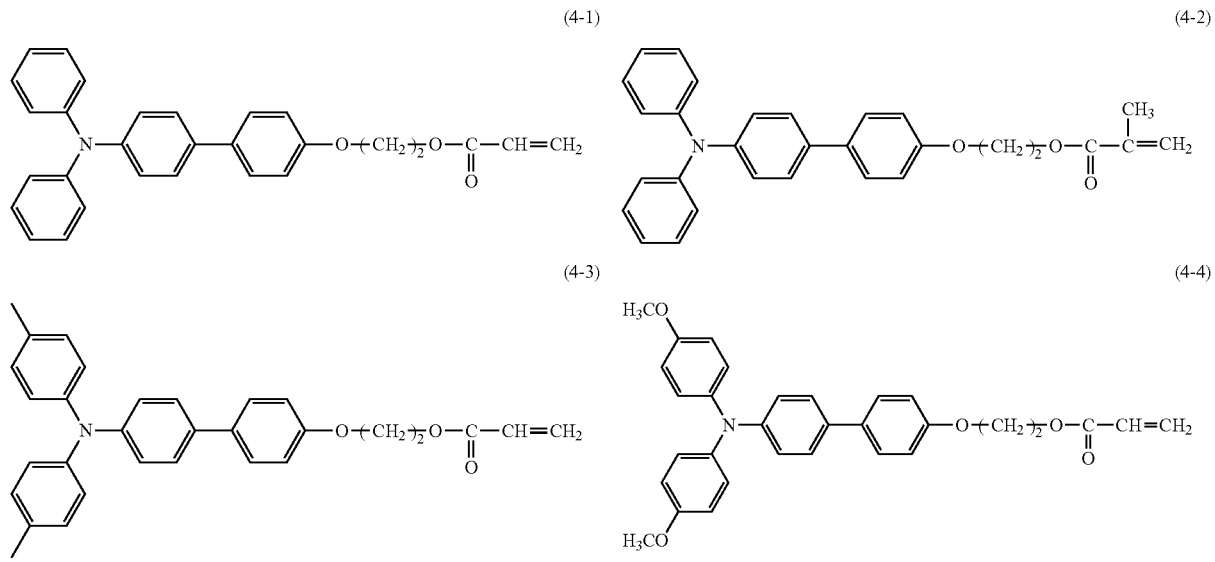

-continued
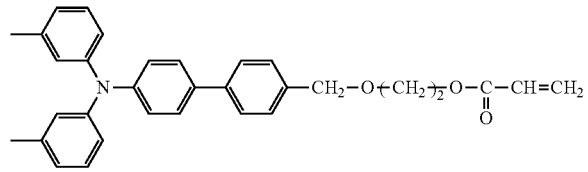
(4-5)
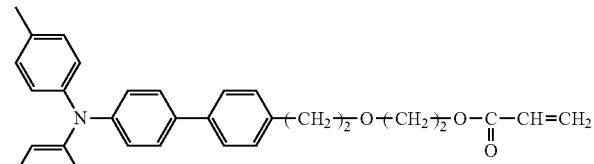
(4-6)
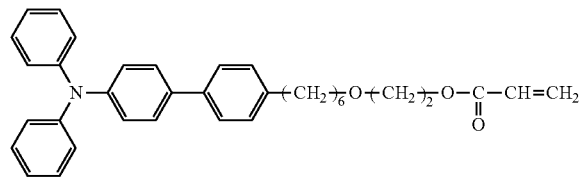
(4-7)
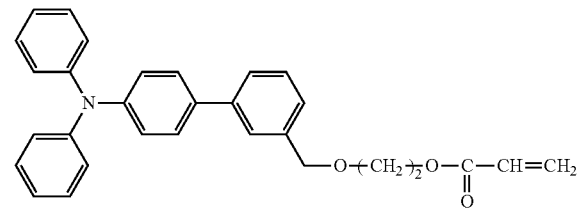
(4-8)
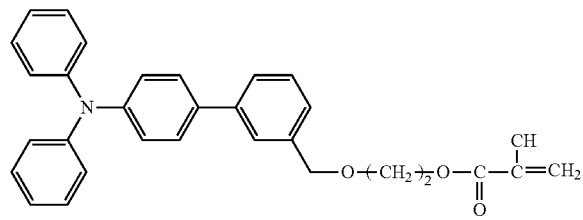
(4-9)
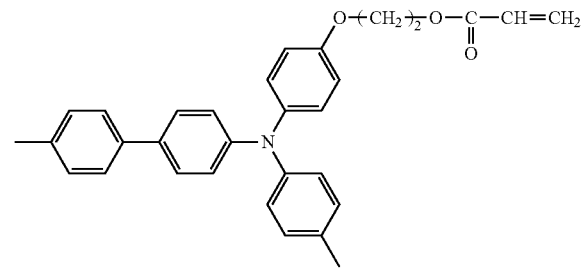
(4-10)
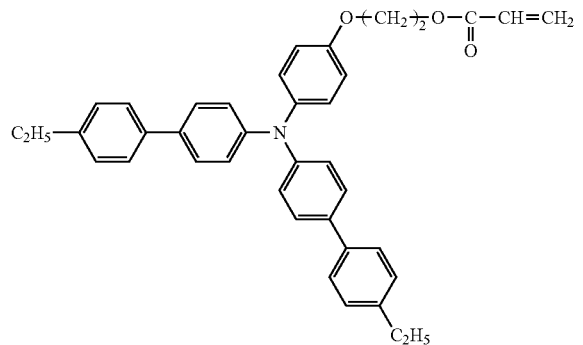
(4-11)
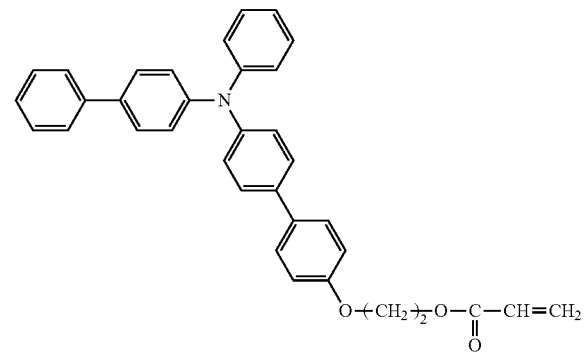
(4-12)
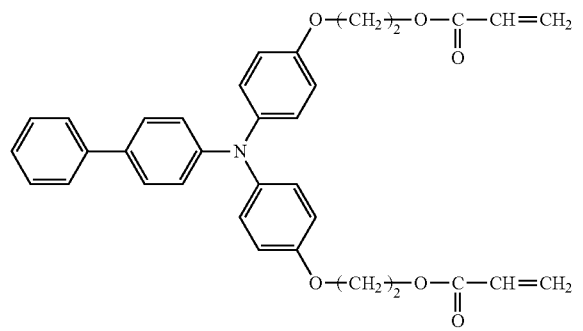
(4-13)
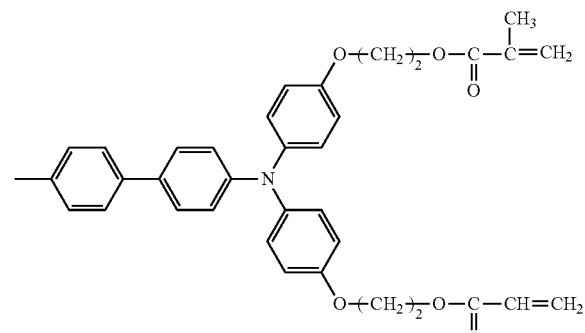
(4-14)
(4-15)
(4-16)

In addition, it is preferable that the composition contains a copolymerized product of a composition containing a compound represented by the following formula (6) or the following formula (7), from the viewpoint of suppressing the image flow. The present inventors assume the reason in the following way. The compounds represented by the formula (6) and the formula (7) have each a polar moiety at a central portion of the structure. Similarly, the compound represented by the formula (3) also has a polar moiety at a central portion of the structure; and accordingly the compound represented by the formula (3) is well compatible with the compounds represented by the formula (6) and the formula (7), and tends to be easily distributed uniformly in the film. Furthermore, the compounds represented by the formula (6) and formula (7) have a large number of polymerizable functional groups, and accordingly the compounds tend to easily react with other polymerizable compounds, and the film becomes dense. From the above description, it is considered to be because the film tends to become uniformly dense in all portions and the image flow is further suppressed.

cycloalkylene group, or a substituted or unsubstituted phenylene group. The substituents are each independently an alkyl group having 1 to 3 carbon atoms. In the formula (7), $R^{71}$ to $R^{76}$ are a hydrogen atom or a methyl group; and k represents 1 to 9, and m represents 0 or 1 to 3.)

Specific examples of the compounds represented by the formula (6) and the formula (7) of the present disclosure will be shown below, but the present disclosure is not limited to the examples.

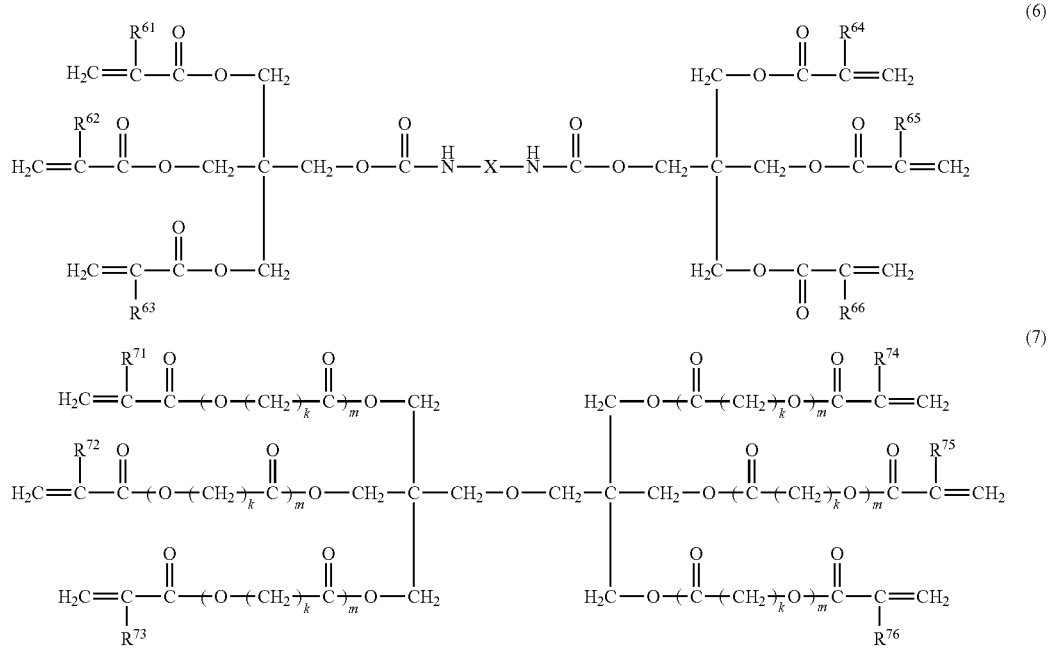

(In the formula (6), $R^{61}$ to $R^{66}$ each independently represent a hydrogen atom or a methyl group. X is a substituted or unsubstituted alkylene group, a substituted or unsubstituted

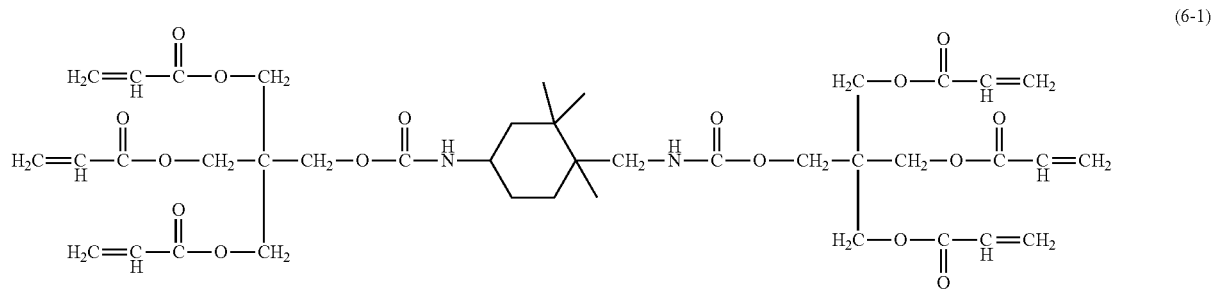

-continued
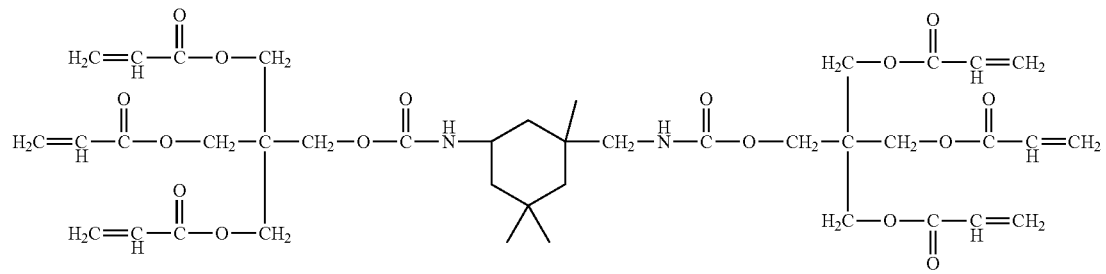
(6-2)
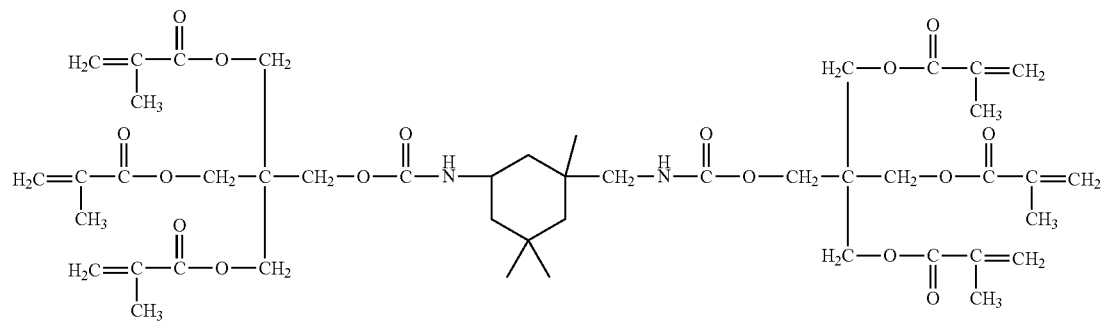
(6-3)
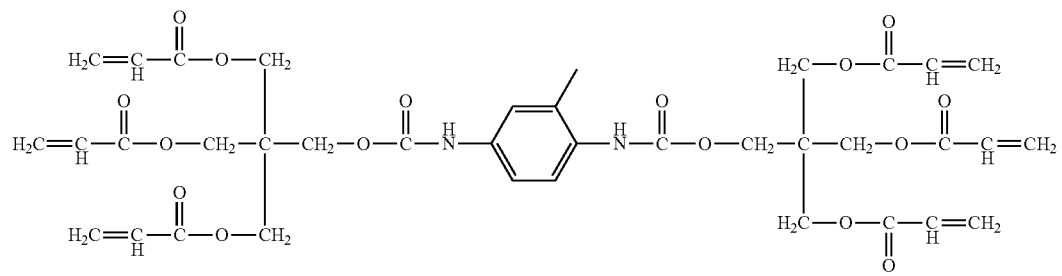
(6-4)
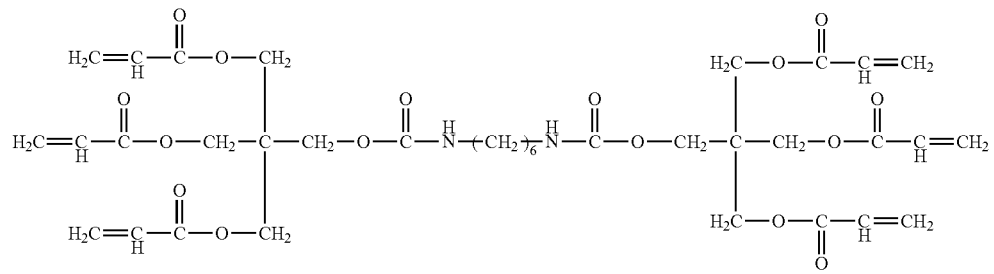
(6-5)
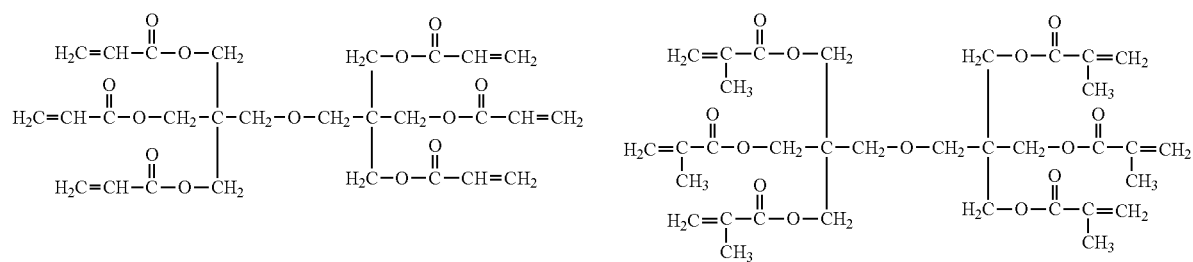
(7-1) (7-2)
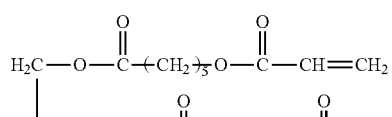
(7-3)

Next, a configuration of the electrophotographic photosensitive member to be used in the present disclosure will be described.

Electrophotographic Photosensitive Member

The electrophotographic photosensitive member of the present disclosure has a support and a photosensitive layer provided on the support.

FIG. 1 is a view illustrating one example of a layer configuration of the electrophotographic photosensitive member.

In FIG. 1, the electrophotographic photosensitive member includes a support 111, an undercoat layer 112, a charge generation layer 113, a charge transport layer 114 and a protective layer 115.

In addition, as described above, the surface layer of the electrophotographic photosensitive member contains a copolymerized product of a composition containing the hole transporting compound represented by the formula (1) and the compound represented by the formula (3).

Examples of a method for producing the electrophotographic photosensitive member of the present disclosure include a method for preparing a coating liquid for each layer, which will be described later, applying the coating liquid in the order of desired layers, followed by drying. Application methods of the coating liquid at this time include dip coating, spray coating, ink jet coating, roll coating, die coating, blade coating, curtain coating, wire bar coating and ring coating. Among the methods, the dip coating is preferable from the viewpoint of efficiency and productivity.

The support and each layer will be described below.

<Support>

In the present disclosure, the electrophotographic photosensitive member has a support. In the present disclosure, it is preferable that the support is an electroconductive support having electroconductivity. In addition, shapes of the support include a cylindrical shape, a belt shape and a sheet shape. Among the supports, the cylindrical support is preferable. In addition, the surface of the support may be subjected to electrochemical treatment such as anodization, blast treatment, cutting treatment.

As a material of the support, a metal, a resin, glass are preferable.

The metals include aluminum, iron, nickel, copper, gold, stainless steel, and alloys thereof. Among the metals, an aluminum support using aluminum is preferable.

In addition, the electroconductivity may be imparted to the resin or the glass by treatment such as mixing of or coating with an electroconductive material.

<Electroconductive Layer>

In the present disclosure, an electroconductive layer may be provided on the support. By the electroconductive layer being provided, the support can conceal scratches and irregularities on its surface and can control the reflection of light on its surface.

It is preferable that the electroconductive layer contains an electroconductive particle and a resin.

Materials of the electroconductive particle include a metal oxide, a metal and carbon black. The metal oxides include zinc oxide, aluminum oxide, indium oxide, silicon oxide, zirconium oxide, tin oxide, titanium oxide, magnesium oxide, antimony oxide and bismuth oxide. The metals include aluminum, nickel, iron, nichrome, copper, zinc and silver.

Among the materials, it is preferable to use a metal oxide as the electroconductive particle, and in particular, it is more preferable to use titanium oxide, tin oxide or zinc oxide.

When the metal oxide is used as the electroconductive particle, the surface of the metal oxide may be treated with a silane coupling agent, and the metal oxide may be doped with an element such as phosphorus or aluminum or an oxide thereof.

In addition, the electroconductive particle may have a layered structure having a core material particle and a covering layer with which the particle is covered. The core material particles include titanium oxide, barium sulfate and zinc oxide. The covering layer includes a metal oxide such as tin oxide.

In addition, when the metal oxide is used as the electroconductive particle, the volume average particle diameter is preferably 1 nm or larger and 500 nm or smaller, and is more preferably 3 nm or larger and 400 nm or smaller.

The resins include a polyester resin, a polycarbonate resin, a polyvinyl acetal resin, an acrylic resin, a silicone resin, an epoxy resin, a melamine resin, a polyurethane resin, a phenol resin and an alkyd resin.

In addition, the electroconductive layer may further contain a concealing agent such as a silicone oil, a resin particle and titanium oxide.

The average film thickness of the electroconductive layer is preferably 1 µm or larger and 50 µm or smaller, and particularly preferably 3 µm or larger and 40 µm or smaller.

The electroconductive layer can be formed by preparing a coating liquid for the electroconductive layer, which contains each of the above materials and a solvent, forming a coating film of the coating liquid, and drying the coating film. The solvents to be used for the coating liquid include an alcohol-based solvent, a sulfoxide-based solvent, a ketone-based solvent, an ether-based solvent, an ester-based solvent and an aromatic hydrocarbon-based solvent. Dispersion methods for dispersing the electroconductive particles in the coating liquid for the electroconductive layer include a method using a paint shaker, a sand mill, a ball mill, or a liquid collision type high speed disperser.

<Undercoat Layer>

In the present disclosure, an undercoat layer may be provided on the support or the electroconductive layer. The undercoat layer which has been provided can thereby enhance an adhesion function between layers and impart a charge injection inhibition function.

It is preferable that the undercoat layer contains a resin. In addition, the undercoat layer may be formed as a cured film by a polymerization of a composition containing a monomer having a polymerizable functional group.

The resin includes a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin and a cellulose resin.

The polymerizable functional group which the monomer having the polymerizable functional group has includes an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group and a carbon-carbon double bond group.

In addition, the undercoat layer may further contain an electron transport material, a metal oxide, a metal, an electroconductive polymer, for the purpose of enhancing the electrical characteristics. Among the materials, it is preferable to use the electron transport material and the metal oxide.

The electron transport materials include a quinone compound, an imide compound, a benzimidazole compound, a cyclopentadienylidene compound, a fluorenone compound, a xanthone compound, a benzophenone compound, a cyano vinyl compound, a halogenated aryl compound, a silole compound and a boron-containing compound. The undercoat layer may be formed as a cured film by using an electron transport material having a polymerizable functional group as the electron transport material, and copolymerizing the electron transport material with a monomer having the above polymerizable functional group.

The metal oxides include indium tin oxide, tin oxide, indium oxide, titanium oxide, zinc oxide, aluminum oxide and silicon dioxide. The metals include gold, silver and aluminum.

In addition, the undercoat layer may further contain an additive.

The average film thickness of the undercoat layer is preferably 0.1 µm or larger and 50 µm or smaller, more preferably 0.2 µm or larger and 40 µm or smaller, and particularly preferably 0.3 µm or larger and 30 µm or smaller.

The undercoat layer can be formed by preparing a coating liquid for the undercoat layer which contains each of the above materials and a solvent, forming a coating film of the coating liquid on the support or the electroconductive layer, and drying and/or curing the coating film. The solvents to be used for the coating liquid include an alcohol-based solvent, a ketone-based solvent, an ether-based solvent, an ester-based solvent and an aromatic hydrocarbon-based solvent.

<Photosensitive Layer>

The photosensitive layer of the electrophotographic photosensitive member is mainly classified into (1) a laminate type photosensitive layer and (2) a mono-layer type photosensitive layer. The laminate type photosensitive layer (1) includes a charge generation layer containing a charge generation material and a charge transport layer containing a charge transport material. (2) The mono-layer type photosensitive layer is a photosensitive layer which includes both of the charge generation material and the charge transport material.

(1) Laminate Type Photosensitive Layer

The laminate type photosensitive layer includes the charge generation layer, and the charge transport layer.

(1-1) Charge Generation Layer

It is preferable that the charge generation layer contains the charge generation material and a resin.

The charge generation materials include an azo pigment, a perylene pigment, a polycyclic quinone pigment, an indigo pigment and a phthalocyanine pigment. Among the pigments, the azo pigment and the phthalocyanine pigment are preferable. Among the phthalocyanine pigments, oxytitanium phthalocyanine pigment, chlorogallium phthalocyanine pigment and hydroxygallium phthalocyanine pigment are preferable.

The content of the charge generation material in the charge generation layer is preferably 40% by mass or more and 85% by mass or less, and more preferably 60% by mass or more and 80% by mass or less, with respect to a total mass of the charge generation layer.

The resins include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. Among the resins, the polyvinyl butyral resin is more preferable.

In addition, the charge generation layer may further contain additives such as an antioxidizing agent and an ultraviolet absorbing agent. Specific additives include a hindered phenol compound, a hindered amine compound, a sulfur compound, a phosphorus compound and a benzophenone compound.

The average film thickness of the charge generation layer is preferably 0.1 µm or larger and 1 µm or smaller, and more preferably 0.15 µm or larger and 0.4 µm or smaller.

The charge generation layer can be formed by preparing a coating liquid for charge generation layer which contains each of the above materials and a solvent, forming a coating film of the coating liquid on the undercoat layer, and drying the coating film. The solvents to be used for the coating liquid include an alcohol-based solvent, a sulfoxide-based solvent, a ketone-based solvent, an ether-based solvent, an ester-based solvent and an aromatic hydrocarbon-based solvent.

(1-2) Charge Transport Layer

It is preferable that the charge transport layer contains a charge transport material and a resin.

The charge transport materials include a polycyclic aromatic compound, a heterocyclic compound, a hydrazone compound, a styryl compound, an enamine compound, a benzidine compound, a triarylamine compound, and resins having a group derived from these materials.

A content of the charge transport material in the charge transport layer is preferably 25% by mass or more and 70% by mass or less, and is more preferably 30% by mass or more and 55% by mass or less, with respect to a total mass of the charge transport layer.

The resins include a polyester resin, a polycarbonate resin, an acrylic resin and a polystyrene resin. Among the resins, the polycarbonate resin and the polyester resin are preferable. In the polyester resins, a polyarylate resin is particularly preferable.

A content ratio (mass ratio) between the charge transport material and the resin is preferably 4:10 to 20:10, and is more preferably 5:10 to 12:10.

In addition, the charge transport layer may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorine resin particle, a polystyrene resin particle, a polyethylene resin particle, a silica particle, an alumina particle and a boron nitride particle.

In particular, it is preferable that the charge transport layer contains a compound represented by the following formula (8), from the viewpoint of suppressing the image flow while keeping the adequate electrical characteristics. The present inventors assume the reason in the following way. The compound of the following formula (8) has a polymerization inhibitory action, and accordingly suppresses cross linkage between the surface layer and the lower photosensitive layer which comes in contact with the surface layer, in the vicinity of the interface. It is considered to be because thereby the copolymerization between the compounds of the formula (1) and the formula (3) tends to easily occur not in the interface between the surface layer and the lower photosensitive layer which comes in contact with the surface layer, but in the surface side of the surface layer, and as a result, the denseness is enhanced in the surface side of the surface layer, which suppresses the permeation of a water content in the air to the surface layer.

(8)

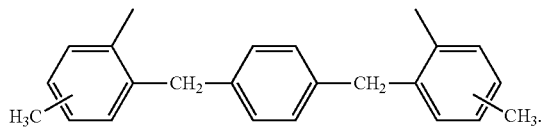

Specific examples of the compound represented by the formula (8) of the present disclosure will be shown below, but the present disclosure is not limited to the examples.

(8-1)

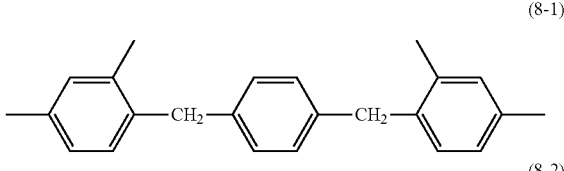

(8-2)

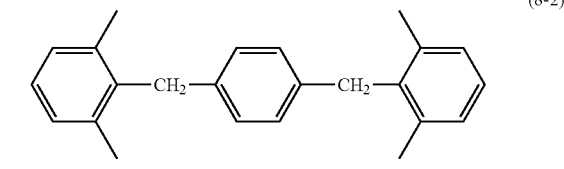

(8-3)

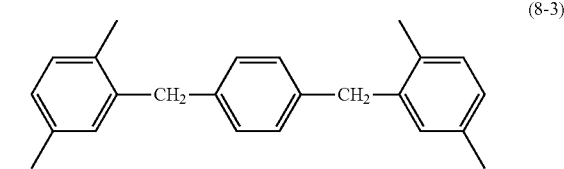

The average film thickness of the charge transport layer is preferably 5 μm or larger and 50 μm or smaller, more preferably 8 μm or larger and 40 μm or smaller, and particularly preferably 10 μm or larger and 30 μm or smaller.

The charge transport layer can be formed by preparing a coating liquid for the charge transport layer, which contains each of the above materials and a solvent, forming a coating film of the coating liquid on the charge generation layer, and drying the coating film. The solvents to be used for the coating liquid include an alcohol-based solvent, a ketone-based solvent, an ether-based solvent, an ester-based solvent and an aromatic hydrocarbon-based solvent. Among the above solvents, the ether-based solvent or the aromatic hydrocarbon-based solvent is preferable.

(2) Mono-layer Type Photosensitive Layer

The mono-layer type photosensitive layer can be formed by preparing a coating liquid for the photosensitive layer containing a charge generation material, a charge transport material, a resin and a solvent, forming the coating film of the coating liquid, and drying the coating film. Examples of the charge generation material, the charge transport material and the resin are the same as the materials included in the examples in the above "(1) laminate type photosensitive layer".

<Protective Layer>

In the present disclosure, a protective layer may be provided on the photosensitive layer. By having the protective layer provided therein, the electrophotographic photosensitive member can improve its durability.

In addition, the protective layer may be formed as a cured film by the polymerization of a composition containing a monomer having a polymerizable functional group. Reactions at this time include a thermal polymerization reaction, a photopolymerization reaction, and a radiation-induced polymerization reaction. The polymerizable functional groups that the monomer which has a polymerizable functional group has include an acryloyloxy group and a methacryloyloxy group. As a monomer having the polymerizable functional group, a material having a charge transport capability may be used.

The protective layer may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorine resin particle, a polystyrene resin particle, a polyethylene resin particle, a silica particle, an alumina particle and a boron nitride particle.

Furthermore, the charge transport material can be added. The charge transport materials include a polycyclic aromatic compound, a heterocyclic compound, a hydrazone compound, a styryl compound, an enamine compound, a benzidine compound, a triarylamine compound, and resins having a group derived from these materials. Among the materials, the triarylamine compound and the benzidine compound are preferable.

The average film thickness of the protective layer is preferably 0.5 μm or larger and 10 μm or smaller, and is preferably 1 μm or larger and 7 μm or smaller.

The protective layer can be formed by preparing a coating liquid for the protective layer, which contains each of the above materials and a solvent, forming the coating film of the coating liquid on the photosensitive layer, and drying and/or curing the coating film. The solvents to be used for the coating liquid include an alcohol-based solvent, a ketone-based solvent, an ether-based solvent, a sulfoxide-based solvent, an ester-based solvent, an aliphatic halogenated hydrocarbon-based solvent and an aromatic hydrocarbon-based solvent. The alcohol-based solvent is preferable, from the viewpoint that the photosensitive layer of the lower layer is not dissolved.

Means for curing the coating film of the coating liquid for the protective layer includes a method of curing the coating film by heat, ultraviolet light and/or an electron beam. In order to improve the strength of the protective layer of the electrophotographic photosensitive member and the durability of the electrophotographic photosensitive member, it is preferable to cure the coating film by use of ultraviolet light or an electron beam.

In the case where the coating film is irradiated with the electron beam, examples of an accelerator include scanning type, electric curtain type, broad beam type, pulse type and laminar type accelerators. The acceleration voltage of the electron beam is preferably 120 kV or less, from the viewpoint that degradation of the material characteristics due to the electron beam can be suppressed without any loss of polymerization efficiency. In addition, the dose of the electron beam absorbed on the surface of the coating film of the coating liquid for the protective layer is preferably 5 kGy or more and 50 kGy or less, and is more preferably 1 kGy or more and 10 kGy or less.

In addition, when the above composition is cured (polymerized) by use of the electron beam, it is preferable to irradiate the composition with the electron beam under an inert gas atmosphere, and then heat the composition under an inert gas atmosphere, from the viewpoint of suppressing a polymerization inhibition action caused by oxygen. Examples of the inert gas include nitrogen, argon, and helium.

In addition, it is preferable to irradiate the composition with ultraviolet light or the electron beam, and then heat the electrophotographic photosensitive member to 100° C. or higher and 140° C. or lower. Thereby, a protective layer is obtained which has further high durability and suppresses image defects.

The surface of the protective layer may be subjected to surface processing with the use of an abrasive sheet, a shape transfer mold member, glass beads, zirconia beads. In addition, irregularities may be formed on the surface with the use of a constituent material of the coating liquid. It is more preferable to provide concaves or convexes on the protective layer of the electrophotographic photosensitive member, for the purpose of more stabilizing a behavior of a cleaning unit (cleaning blade) which is brought into contact with the electrophotographic photosensitive member.

The above concaves or convexes may be formed on the whole area of the surface of the electrophotographic photosensitive member, or may be formed on a part of the surface of the electrophotographic photosensitive member. In the case where the concaves or the convexes are formed on a part of the surface of the electrophotographic photosensitive member, it is preferable that the concaves or the convexes are formed at least on the whole area of the contact region with the cleaning unit (cleaning blade).

In the case where the concaves or the convexes are formed, the concaves or the convexes can be formed on the surface of the electrophotographic photosensitive member, by operations of: bringing a mold having the convexes corresponding to the concaves or the concaves corresponding to the convexes, into pressure contact with the surface of the electrophotographic photosensitive member; and transferring the shapes to the surface.

Accordingly, the surface layer of the electrophotographic photosensitive member according to the present disclosure is a charge transport layer or a protective layer when being a laminate type photosensitive layer, and a photosensitive layer or a protective layer when being a mono-layer type photosensitive layer.

[Process Cartridge and Electrophotographic Apparatus]

The process cartridge of the present disclosure integrally supports the electrophotographic photosensitive member described above, and at least one unit selected from the group consisting of a charging unit, a developing unit, a transfer unit and a cleaning unit; and is detachably attachable to a main body of an electrophotographic apparatus.

In addition, the electrophotographic apparatus of the present disclosure includes the electrophotographic photosensitive member described above, a charging unit, an exposure unit, a developing unit and a transfer unit.

Figure 2:
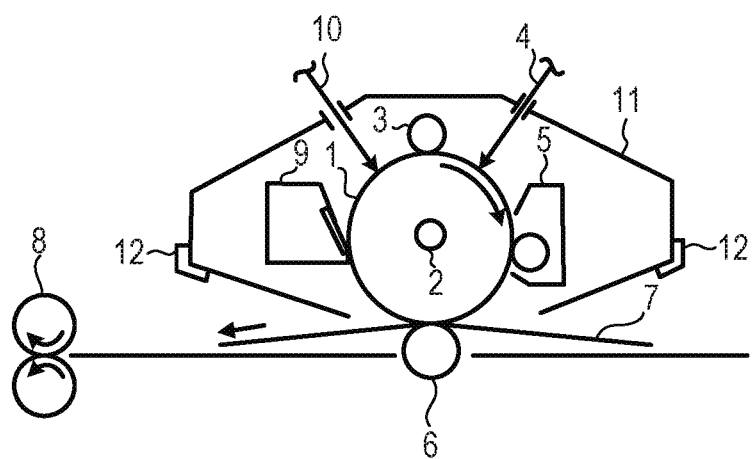
FIG. 2 is a view illustrating one schematic configuration example of an electrophotographic apparatus provided with a process cartridge having the electrophotographic photosensitive member of the present disclosure.

FIG. 2 illustrates one example of a schematic configuration of an electrophotographic apparatus having the process cartridge provided with an electrophotographic photosensitive member.

Reference Numeral 1 represents a cylinder-shaped electrophotographic photosensitive member, and the electrophotographic photosensitive member is rotary-driven around a shaft 2 in an arrow direction at a predetermined circumferential velocity. The surface of the electrophotographic photosensitive member 1 is charged to a predetermined positive or negative potential by a charging unit 3. For information, in the figure, a roller charging system by a roller type charging member is illustrated, but a charging system such as a corona charging system, a proximity charging system or an injection charging system may also be adopted. The surface of the charged electrophotographic photosensitive member 1 is irradiated with exposure light 4 emitted from an exposure unit (not illustrated), and an electrostatic latent image corresponding to objective image information is formed on the surface. The electrostatic latent image formed on the surface of the electrophotographic photosensitive member 1 is developed by a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 to which the toner image has been transferred is conveyed to a fixing unit 8, is subjected to fixing treatment of the toner image, and is printed out to the outside of the electrophotographic apparatus. The electrophotographic apparatus may have a cleaning unit 9 for removing an adherent such as a toner remaining on the surface of the electrophotographic photosensitive member 1 after transferring. Alternatively, a cleaning unit may not be separately provided, but a so-called cleaner-less system may be used that removes the above adherent by a developing unit. The electrophotographic apparatus may have a neutralization mechanism that subjects the surface of the electrophotographic photosensitive member 1 to neutralization treatment by pre-exposure light 10 emitted from a pre-exposure unit (not illustrated). In addition, a guiding unit 12 such as a rail may also be provided in order to detachably attach the process cartridge 11 of the present disclosure to a main body of the electrophotographic apparatus.

The electrophotographic photosensitive member of the present disclosure can be used in a laser beam printer, an LED printer, a copying machine, a facsimile, a combined machine thereof.

EXAMPLES

The present disclosure will be described below in more detail with reference to Examples and Comparative Examples. The present disclosure is not limited to the following Examples at all as long as the present disclosure does not depart from the gist thereof. Herein, "part(s)" in the following Examples is on a mass basis unless otherwise particularly noted.

Example 1

An aluminum cylinder having a diameter of 30 mm, a length of 357.5 mm and a thickness of 1 mm was used as a support (electroconductive support).

Next, 5 parts of N-methoxymethylated nylon (FR101, produced by Namariichi Co., Ltd.), 70 parts of methanol, and 30 parts of n-butanol were mixed, and a coating liquid for an undercoat layer 1 was prepared.

The aluminum cylinder was dip-coated with the coating liquid for the undercoat layer 1 to form a coating film, and the resultant coating film was heated and dried at 130° C. for 10 minutes to form an undercoat layer 1 having a film thickness of 0.7 μm.

Next, 24 parts of alkyd resin (Beckolite M6401-50, produced by DIC Corporation), 16 parts of a melamine resin (Amidir L-150-60, produced by DIC Corporation), 160 parts of titanium oxide particles (CR-EL, produced by Ishihara Sangyo Kaisha, Ltd.) and 500 parts of methyl ethyl ketone were mixed. After that, dispersion was performed for 10 hours while a sand mill which used glass beads having a diameter of 0.8 mm was used as a dispersing machine, and a coating liquid for an undercoat layer 2 was prepared. The above undercoat layer 1 was dip-coated with the coating liquid for the undercoat layer 2 to form a coating film, and the obtained coating film was heated and dried at 130° C. for 20 minutes to form an undercoat layer 2 having a film thickness of 3.5 μm.

Next, 2.5 parts of a titanyl phthalocyanine pigment (titanyl phthalocyanine pigment having maximum diffraction peak at position of at least 27.2°±0.2° of Bragg angle in measurement of Cu—Kα characteristic X-ray diffraction spectrum), 0.5 parts of a polyvinyl butyral resin (ESREC BX-1, produced by Sekisui Chemical Co., Ltd.) and 280 parts of methyl ethyl ketone were mixed. After that, the dissolved substances were dispersed for 1 hour while a sand mill which used glass beads having a diameter of 1 mm was used as the dispersing machine, and a coating liquid for a charge generation layer was prepared. The undercoat layer 2 was dip-coated with the coating liquid for the charge generation layer to form a coating film, and the obtained coating film was heated and dried at 90° C. for 10 minutes to form the charge generation layer having a film thickness of 0.2 μm.

Next, a coating liquid for the charge transport layer was prepared, by mixing 10 parts of a polycarbonate resin (Panlite TS-2050, produced by Teijin Limited), 10 parts of 4,4'-dimethyl-4"-(β-phenylstyryl) triphenylamine, 0.5 parts of a compound represented by formula (8-1), and 0.1 parts of silicone oil (KF50-100CS, produced by Shin-Etsu Chemical Co., Ltd.), with 80 parts of tetrahydrofuran were mixed. The charge generation layer was dip-coated with the coating liquid for the charge transport layer to form a coating film, and the obtained coating film was heated and dried at 110° C. for 60 minutes to form the charge transport layer having a film thickness of 22 μm.

After that, a coating liquid for a protective layer was prepared by mixing 10.0 parts of a hole transporting compound represented by the formula (1-3), 4.5 parts of the compound represented by the formula (3-1), 5.5 parts of the compound represented by the formula (7-4), 0.20 parts of the compound represented by the formula (4-3), and 0.5 parts of 1-hydroxycyclohexyl phenyl ketone of a photopolymerization initiator, with 80 parts of tetrahydrofuran.

Next, the charge transport layer was dip-coated with the coating liquid for the protective layer to form a coating film, and the obtained coating film was dried at 60° C. for 5 minutes. After drying, the coating film was irradiated with ultraviolet rays for 120 seconds at an irradiation intensity of 700 mW/cm² with the use of a metal halide lamp having an output of 160 W/cm. After that, the coating film was subjected to heat treatment at 130° C. for 30 minutes to form a protective layer having a film thickness of 5.0 μm.

In this way, an electrophotographic photosensitive member was produced which had the undercoat layer 1, the undercoat layer 2, the charge generation layer, the charge transport layer and the protective layer in this order on the support.

Examples 2 to 4

An electrophotographic photosensitive member was produced in the same manner as in Example 1, except that the types and contents of the compound represented by the formula (1), the compound represented by the formula (3), the compound represented by the formula (4) and the compound represented by the formula (7) were changed as shown in Table 1, and the coating liquid for the protective layer was prepared.

Example 5

An electrophotographic photosensitive member was produced in the same manner as in Example 1, except that the compound represented by the formula (7-4) was changed from 5.5 parts to 2.75 parts, and 2.75 parts of a compound represented by the following formula (A) was further added, and the coating liquid for the protective layer was prepared.

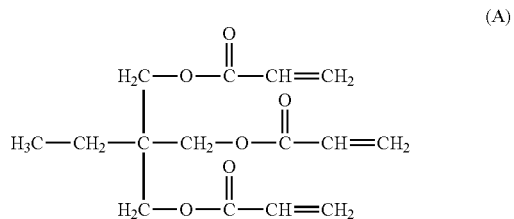 [SMILES: C=CC(=O)OCC(CC)(COC(=O)C=C)COC(=O)C=C]

Example 6

A coating liquid for a charge transport layer was prepared in the same manner as in Example 1, except that the coating liquid for the charge transport layer was prepared by adding the compound represented by the formula (8-2) instead of the compound represented by the formula (8-1).

Furthermore, a coating liquid for a protective layer was prepared in the same manner as in Example 1, by adding a hole transporting compound represented by the formula (1-9) instead of the hole transporting compound represented by the formula (1-3), and further adding the compound represented by the formula (7-1) instead of the compound represented by the formula (7-4).

In the same manner as in Example 1 except for the above description, an electrophotographic photosensitive member was produced.

Example 7

A coating liquid for a charge transport layer was prepared in the same manner as in Example 1, by adding the compound represented by the formula (8-2) instead of the compound represented by the formula (8-1).

Furthermore, a coating liquid for a protective layer was prepared in the same manner as in Example 1, by adding the compound represented by the formula (6-1) instead of the compound represented by the formula (7-4).

In the same manner as in Example 1 except for the above description, an electrophotographic photosensitive member was produced.

Example 8

An electrophotographic photosensitive member was produced in the same manner as in Example 7, except that the types and contents of the compound represented by the formula (1), the compound represented by the formula (3), the compound represented by the formula (4) and the compound represented by the formula (6) were changed as shown in Table 1, and the coating liquid for the protective layer was prepared.

Example 9

In the same manner as in Example 1, an undercoat layer 1, an undercoat layer 2, a charge generation layer and a charge transport layer were formed on a support.

After that, a coating liquid for a protective layer was prepared, by mixing 10.0 parts of the hole transporting compound represented by the formula (1-13), 4.5 parts of the compound represented by the formula (3-1), 5.5 parts of the compound represented by the formula (7-5), and 0.20 parts of the compound represented by the formula (4-13), with 80 parts of n-propanol.

Next, the charge transport layer was dip-coated with the coating liquid for the protective layer to form a coating film, and the obtained coating film was dried at 40° C. for 5 minutes. After drying, the coating film was irradiated with an electron beam for 1.6 seconds in a nitrogen atmosphere under conditions of an acceleration voltage of 70 KV and an absorbed dose of 15 kGy. After that, the coating film was heated for 15 seconds in a nitrogen atmosphere under such conditions that the temperature of the coating film became 135° C. The oxygen concentration between times of the irradiation with the electron beam and the heat treatment for 15 seconds was 15 ppm. Next, in the air, the coating film was subjected to heat treatment under the condition that the coating film became 105° C. for 30 minutes, and a protective layer was formed of which the film thickness was 5.0 μm.

In this way, the electrophotographic photosensitive member was produced which had the undercoat layer 1, the undercoat layer 2, the charge generation layer, the charge transport layer, and the protective layer in this order on the support.

Example 10

An electrophotographic photosensitive member was produced in the same manner as in Example 5, except that 2.75 parts of the compound represented by the above formula (A) was changed to 5.5 parts, and a coating liquid for the protective layer was prepared without adding the compound represented by the above formula (7-4).

Examples 11 to 12

An electrophotographic photosensitive member was produced in the same manner as in Example 1, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Example 13

A coating liquid for the charge transport layer was prepared in the same manner as in Example 1, except that a coating liquid for the charge transport layer was prepared without adding the compound represented by the formula (8-1).

Furthermore, a coating liquid for the protective layer was prepared by mixing 10.0 parts of a hole transporting compound represented by the formula (1-3), 4.5 parts of the compound represented by formula (3-4), 5.5 parts of the compound represented by the formula (7-4), 0.20 parts of the compound represented by the formula (4-3), and 0.5 parts of 1-hydroxycyclohexyl phenyl ketone of the photopolymerization initiator, with 80 parts of tetrahydrofuran.

In the same manner as in Example 1 except for the above description, an electrophotographic photosensitive member was produced.

Example 14

An electrophotographic photosensitive member was produced in the same manner as in Example 13, except that the types and contents of the compound represented by the formula (1), the compound represented by the formula (3), the compound represented by the formula (4) and the compound represented by the formula (7) were changed as shown in Table 1, and a coating liquid for the protective layer was prepared.

Example 15

An electrophotographic photosensitive member was produced in the same manner as in Example 13, except that a coating liquid for the protective layer was prepared by adding 5.5 parts of the compound represented by the above formula (A), without adding the compound represented by the formula (7-4).

Example 16

An electrophotographic photosensitive member was produced in the same manner as in Example 15, except that a coating liquid for a protective layer was prepared without adding the compound represented by the formula (4-3).

Examples 17 to 18

An electrophotographic photosensitive member was produced in the same manner as in Example 13, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Example 19

An electrophotographic photosensitive member was produced in the same manner as in Example 15, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Example 20

An electrophotographic photosensitive member was produced in the same manner as in Example 13, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Example 21

An electrophotographic photosensitive member was produced in the same manner as in Example 15, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Examples 22 and 23

An electrophotographic photosensitive member was produced in the same manner as in Example 13, except that the types and contents of the compound represented by the formula (1), the compound represented by the formula (3), the compound represented by the formula (4), the compound represented by the formula (6) and the compound represented by the formula (7) were changed as shown in Table 1, and a coating liquid for the protective layer was prepared.

Comparative Example 1

An electrophotographic photosensitive member was produced in the same manner as in Example 17, except that a coating liquid for the protective layer was prepared without adding the compound represented by the formula (3-4).

Comparative Example 2

An electrophotographic photosensitive member was produced in the same manner as in Example 18, except that a coating liquid for a protective layer was prepared by adding 4.5 parts of the compound represented by the following formula (B) instead of the compound represented by the formula (3-4).

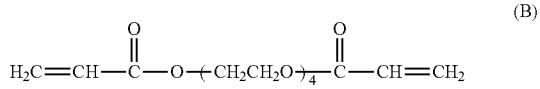

Comparative Example 3

An electrophotographic photosensitive member was produced in the same manner as in Example 18, except that a coating liquid for a protective layer was prepared by adding 4.5 parts of the compound represented by the following formula (C) instead of the compound represented by the formula (3-4).

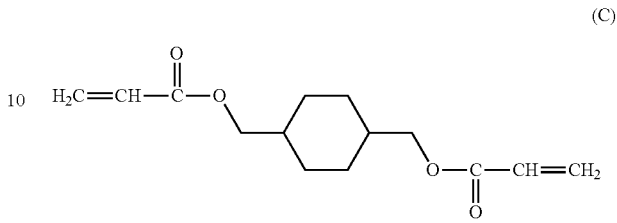

Comparative Example 4

An electrophotographic photosensitive member was produced in the same manner as in Example 16, except that a coating liquid for the protective layer was prepared without adding the compound represented by formula (3-6).

Comparative Example 5

An electrophotographic photosensitive member was produced in the same manner as in Example 13, except that a coating liquid for the protective layer was prepared without adding the compound represented by the formula (3-4) and the compound represented by the formula (4-3).

Comparative Example 6

An electrophotographic photosensitive member was produced in the same manner as in Comparative Example 5, except that a coating liquid for the protective layer was prepared by further adding 4.5 parts of the compound represented by the formula (A).

Comparative Example 7

An electrophotographic photosensitive member was produced in the same manner as in Example 5, except that a coating liquid for the protective layer was prepared without adding the compound represented by the formula (3-1).

Comparative Example 8

An electrophotographic photosensitive member was produced in the same manner as in Example 12, except that a coating liquid for the protective layer was prepared without adding the compound represented by the formula (3-4).

TABLE 1

|  | Formula (1) | | Formula (3) | | | Formula (4) | | Formula (6), Formula (7) | | 1-Hydroxycyclohexyl phenyl ketone | Other | |
|---|---|---|---|---|---|---|---|---|---|---|---|---|
|  | Compound | Parts | Compound | Parts | Ratio (3)/(1) | Compound | Parts | Compound | Parts | Parts | Compound | Parts |
| Example 1 | (1-3) | 10.0 | (3-1) | 4.5 | 0.45 | (4-3) | 0.20 | (7-4) | 5.5 | 0.5 | — | — |
| Example 2 | (1-3) | 10.0 | (3-1) | 2.5 | 0.25 | (4-3) | 0.20 | (7-4) | 5.5 | 0.5 | — | — |
| Example 3 | (1-3) | 10.0 | (3-1) | 7.0 | 0.70 | (4-3) | 0.30 | (7-4) | 3.0 | 0.5 | — | — |
| Example 4 | (1-3) | 10.0 | (3-3) | 4.5 | 0.45 | (4-3) | 0.20 | (7-4) | 5.5 | 0.5 | — | — |
| Example 5 | (1-3) | 10.0 | (3-1) | 4.5 | 0.45 | (4-3) | 0.20 | (7-4) | 2.75 | 0.5 | Formula (A) | 2.75 |
| Example 6 | (1-9) | 10.0 | (3-1) | 4.5 | 0.45 | (4-9) | 0.10 | (7-1) | 5.5 | 0.5 | — | — |
| Example 7 | (1-3) | 10.0 | (3-1) | 4.5 | 0.45 | (4-3) | 0.20 | (6-1) | 5.5 | 0.5 | — | — |

TABLE 1-continued

| | Formula (1) | | Formula (3) | | | Formula (4) | | Formula (6), Formula (7) | | 1-Hydroxycyclohexyl phenyl ketone | Other | |
|---|---|---|---|---|---|---|---|---|---|---|---|---|
| | Compound | Parts | Compound | Parts | Ratio (3)/(1) | Compound | Parts | Compound | Parts | Parts | Compound | Parts |
| Example 8 | (1-13) | 10.0 | (3-1) | 4.5 | 0.45 | (4-13) | 0.20 | (6-2) | 5.5 | 0.5 | — | — |
| Example 9 | (1-13) | 10.0 | (3-1) | 4.5 | 0.45 | (4-13) | 0.20 | (7-5) | 5.5 | — | — | — |
| Example 10 | (1-3) | 10.0 | (3-1) | 4.5 | 0.45 | (4-3) | 0.20 | — | — | 0.5 | Formula (A) | 5.5 |
| Example 11 | (1-3) | 10.0 | (3-1) | 4.5 | 0.45 | — | — | (7-4) | 5.5 | 0.5 | — | — |
| Example 12 | (1-13) | 10.0 | (3-4) | 4.5 | 0.45 | (4-13) | 0.20 | (6-1) | 5.5 | 0.5 | — | — |
| Example 13 | (1-3) | 10.0 | (3-4) | 4.5 | 0.45 | (4-3) | 0.20 | (7-4) | 5.5 | 0.5 | — | — |
| Example 14 | (1-21) | 10.0 | (3-6) | 4.5 | 0.45 | (4-21) | 0.20 | (7-4) | 5.5 | 0.5 | — | — |
| Example 15 | (1-3) | 10.0 | (3-4) | 4.5 | 0.45 | (4-3) | 0.20 | — | — | 0.5 | Formula (A) | 5.5 |
| Example 16 | (1-3) | 10.0 | (3-6) | 4.5 | 0.45 | — | — | — | — | 0.5 | Formula (A) | 5.5 |
| Example 17 | (1-13) | 10.0 | (3-4) | 4.5 | 0.45 | — | — | — | — | 0.5 | — | — |
| Example 18 | (1-3) | 10.0 | (3-4) | 4.5 | 0.45 | — | — | — | — | 0.5 | — | — |
| Example 19 | (1-3) | 10.0 | (3-4) | 1.0 | 0.10 | — | — | — | — | 0.5 | Formula (A) | 5.5 |
| Example 20 | (1-3) | 10.0 | (3-4) | 10.0 | 1.00 | — | — | — | — | 0.5 | — | — |
| Example 21 | (1-3) | 10.0 | (3-4) | 0.5 | 0.05 | — | — | — | — | 0.5 | Formula (A) | 5.5 |
| Example 22 | (1-3) | 10.0 | (3-4) | 12.0 | 1.20 | — | — | — | — | 0.5 | — | — |
| Example 23 | (1-13) | 10.0 | (3-4) | 0.5 | 0.05 | — | — | — | — | 0.5 | — | — |
| Comparative Example 1 | (1-13) | 10.0 | — | — | 0.00 | — | — | — | — | 0.5 | — | — |
| Comparative Example 2 | (1-3) | 10.0 | | | | — | — | — | — | 0.5 | Formula (B) | 4.5 |
| Comparative Example 3 | (1-3) | 10.0 | | | | — | — | — | — | 0.5 | Formula (C) | 4.5 |
| Comparative Example 4 | (1-3) | 10.0 | | | | — | — | — | — | 0.5 | Formula (A) | 5.5 |
| Comparative Example 5 | (1-3) | 10.0 | | | | — | — | (7-4) | 5.5 | 0.5 | — | — |
| Comparative Example 6 | (1-3) | 10.0 | | | | — | — | (7-4) | 5.5 | 0.5 | Formula (A) | 4.5 |
| Comparative Example 7 | (1-3) | 10.0 | | | | (4-3) | 0.20 | (7-4) | 2.75 | 0.5 | Formula (A) | 2.75 |
| Comparative Example 8 | (1-13) | 10.0 | | | | (4-13) | 0.20 | (6-1) | 5.5 | 0.5 | — | — |

[Evaluation]

The image flow and mechanical durability of the electrophotographic photosensitive members which were produced in Examples 1 to 23 and Comparative Examples 1 to 8, and the electrical characteristics of the electrophotographic photosensitive members which were produced in Examples 1 and 18 to 22 were evaluated in the following way.

(Evaluation of Image Flow)

Image flow was evaluated by the following three types of evaluation methods.

(Evaluation 1)

The obtained electrophotographic photosensitive member was mounted to a cartridge of a cyan color in an altered machine of an electrophotographic apparatus (copying machine) (trade name: iR-ADV C5560) made by Canon Inc., which was the evaluation apparatus, in a high temperature and high humidity environment at a temperature of 35° C. and a humidity of 85% RH. As for the altered point, the machine was altered so as to have a process speed of 350 mm/sec and be capable of adjusting and measuring a laser power of the image exposure and the voltage applied to the charging unit. Furthermore, power sources of a heater for the electrophotographic photosensitive member and a cassette heater were turned off, and the altered copying machine was used.

Next, the setting for charging of the copying machine was set so that a potential of a dark portion became −800V. After that, a solid image of a single color of cyan was output onto A4-size plain paper, and an initial light quantity A of image exposure and an initial light quantity B of image exposure were set, by which the concentration on the paper became 1.40±0.05 by a spectral densitometer (trade name: X-rite 504, manufactured by X-rite Incorporated), and by which the concentration became 0.35±0.05, respectively.

After that, 10000 sheets of a square lattice image with a line width of 0.1 mm and a line interval of 10 mm were output in a single color of cyan on A4-size plain paper, in the setting for the charging and the setting for the light quantity that became the initial light quantity A of image exposure which were set in advance.

After that, the main power source of the electrophotographic apparatus was turned off, and the electrophotographic apparatus was left to stand for one day. After the electrophotographic apparatus was left, the main power source of the electrophotographic apparatus was turned on, and a square lattice image having a line width of 0.1 mm and a line interval of 10 mm, and a character image (E character image) in which characters of E of alphabet (font type: Times, font size of 6 points) were repeated were output on A4-size plain paper, which were formed at the light quantity that was set so as to become the initial light quantity A of image exposure, in the setting for the charging in advance. For information, the heater for the electrophotographic photosensitive member and the cassette heater were set to the OFF state all the time even during the evaluation.

The effect of suppressing image defects was evaluated for the obtained images, according to the following evaluation ranks. The larger the rank number is, the more adequate the effect is for the image defect.

Rank 5: an image defect is not observed in the lattice image and the E character image.
Rank 4: a part of the lattice image is foggy, but the image defect of the E character image is not observed.
Rank 3: a part of the lattice image is foggy, and a part of the E character image becomes dilute.
Rank 2: the lattice image is partially lost, and the E character image becomes dilute on whole area.
Rank 1: the lattice image is lost on the whole area, and the E character image becomes dilute on the whole area.

Table 2 shows the obtained evaluation results.

(Evaluation 2)

The obtained electrophotographic photosensitive member was evaluated with the use of the evaluation apparatus which was used in Evaluation 1, in a high temperature and high humidity environment at a temperature of 35° C. and a humidity of 85% RH. In addition, unlike in the case of the Evaluation 1, a drum cartridge from which the cleaning blade was removed was used as the drum cartridge. The heater for the electrophotographic photosensitive member and the cassette heater were set to the OFF state all the time.

Firstly, the condition of the applied voltage was set so that the initial potential of the dark portion (Vd) of the electrophotographic photosensitive member became approximately −850 [V]. In the state in which the applied voltage setting was kept, images having no printing thereon (solid white image) were output from the electrophotographic photosensitive member, onto 150 sheets of the A4-size plain paper, respectively.

After that, the main power source of the electrophotographic apparatus was turned off, and the electrophotographic apparatus was left to stand for one day. After the electrophotographic apparatus was left, the drum cartridge was replaced with a drum cartridge provided with a cleaning blade, and two square lattice images having a line width of 0.1 mm and a line interval of 10 mm were output, which were formed at the light quantity that was set so as to become the initial light quantity A of image exposure in Evaluation 1. The effect of suppressing image defects was evaluated for the obtained second image, according to the following evaluation ranks.

Rank 5: an image defect is not observed in the lattice image.
Rank 4: a horizontal line of the lattice image is broken, but abnormality is not recognized in vertical lines.
Rank 3: a horizontal line of the lattice image is lost, but abnormality is not recognized in vertical lines.
Rank 2: a horizontal line of the lattice image is lost, and a vertical line is broken.
Rank 1: a horizontal line of the lattice image is lost, and also a vertical line is lost.

Table 2 shows the obtained evaluation results.

(Evaluation 3)

The obtained electrophotographic photosensitive member was evaluated with the use of the evaluation apparatus which was used in Evaluation 1, in a high temperature and high humidity environment at a temperature of 35° C. and a humidity of 85% RH. In addition, unlike in the case of the Evaluation 1, a drum cartridge from which the cleaning blade was removed was used as the drum cartridge. The heater for the electrophotographic photosensitive member and the cassette heater were set to the OFF state all the time.

Firstly, the condition of the applied voltage was set so that the initial potential of the dark portion (Vd) of the electrophotographic photosensitive member became approximately −850 [V]. In the state in which the applied voltage setting was kept, images having no printing thereon (solid white image) were passed from the electrophotographic photosensitive member, onto 100 sheets of the A4-size plain paper, respectively.

After that, the main power source of the electrophotographic apparatus was turned off, and the electrophotographic apparatus was left to stand for one day. After the electrophotographic apparatus was left, the drum cartridge was replaced with a drum cartridge provided with a cleaning blade, and eight solid images were continuously output which were formed at the light quantity that was set so as to become the initial light quantity B of image exposure in Evaluation 1. The effect of suppressing image defects was evaluated for the obtained images, according to the following evaluation ranks.

Rank 5: an image defect is not observed in the third solid image.
Rank 4: a part of the third solid image is foggy, but the image defect is not observed in the eighth solid image.
Rank 3: a part of the third solid image is foggy in whole, but the image defect is not observed in the eighth solid image.
Rank 2: the third solid image is foggy in whole, and a part of the eighth solid image is foggy.
Rank 1: the eighth solid image is foggy in whole.

Table 2 shows the obtained evaluation results.

(Evaluation of Mechanical Durability)

The obtained electrophotographic photosensitive member was mounted to a copying machine (trade name: iR-ADV C5560, manufactured by Canon Inc.), and was evaluated in a normal temperature and low humidity environment at a temperature of 23° C. and a humidity of 5% RH.

Firstly, the surface layer thickness in an initial stage of each electrophotographic photosensitive member was measured with the use of an interference film thickness meter (trade name: MCPD-3700, manufactured by Otsuka Electronics Co., Ltd.).

Next, character images having an image printing ratio of 5% were continuously formed on 100,000 sheets of A4-size plain paper.

Next, the electrophotographic photosensitive member was taken out from the electrophotographic apparatus, the surface layer thickness after the output of 100,000 sheets was measured, and a difference in the film thicknesses of the surface layer before and after output of 100,000 sheets, in other words, an amount of scraped surface layer was calculated.

Table 2 shows the obtained evaluation results.

(Evaluation of Electrical Characteristics)

As an evaluation apparatus, an altered machine of a copying machine (trade name: iR-ADV C5560, made by Canon Inc.) was used, which was used in the image flow evaluation. The electrophotographic photosensitive member which formed the image as in the above was mounted to the drum cartridge for this evaluation apparatus, and the electrical characteristics were evaluated in the following way.

In a normal temperature and low humidity environment at a temperature of 23° C. and a humidity of 5% RH, the condition of the applied voltage (applied voltage setting C) and the condition of the exposure light quantity (exposure light quantity C) of the exposure apparatus were set so that an initial potential of the dark portion (Vd) of the obtained electrophotographic photosensitive member became −900 [V] and an initial potential of a bright portion (V1) thereof became −400 [V].

The surface potential of the electrophotographic photosensitive member was measured by using a surface potential meter (model 344: made by Trek, Inc.), after operations of:

demounting a cartridge for development from the evaluation apparatus; and fixing a potential probe (trade name: model 6000B-8, made by Trek, Inc.) there.

After that, images having an image printing ratio of 5% were continuously formed on 50000 sheets of A4-size plain paper.

After the images of 50000 sheets were output, the cartridge for development was replaced with a potential measurement apparatus including the above potential probe and surface potential meter, the above applied voltage setting C was applied thereto, and the potential of the bright portion (V1a) of the surface of the electrophotographic photosensitive member was measured at the time when the electrophotographic photosensitive member was exposed to light of the above exposure light quantity C. Then, the variation between the potentials of the bright portion |ΔV1| (the absolute value of ΔV1 represented by ΔV1=|V1a|−200) on the surface of the electrophotographic photosensitive member was calculated, which were potentials of the initial stage and after 50000 sheets of continuous images were formed.

Table 3 shows the obtained evaluation results.

TABLE 2

| | Rank of image flow | | | |
| --- | --- | --- | --- | --- |
| | Evaluation 1 | Evaluation 2 | Evaluation 3 | Amount of scrape |
| Example 1 | 5 | 5 | 5 | 0.4 μm |
| Example 2 | 5 | 5 | 5 | 0.4 μm |
| Example 3 | 5 | 5 | 5 | 0.4 μm |
| Example 4 | 5 | 5 | 5 | 0.4 μm |
| Example 5 | 5 | 5 | 5 | 0.3 μm |
| Example 6 | 5 | 5 | 5 | 0.4 μm |
| Example 7 | 5 | 5 | 5 | 0.4 μm |
| Example 8 | 5 | 5 | 5 | 0.3 μm |
| Example 9 | 5 | 5 | 5 | 0.3 μm |
| Example 10 | 5 | 5 | 4 | 0.6 μm |
| Example 11 | 5 | 5 | 4 | 0.4 μm |
| Example 12 | 5 | 4 | 4 | 0.3 μm |
| Example 13 | 5 | 4 | 3 | 0.4 μm |
| Example 14 | 5 | 4 | 3 | 0.4 μm |
| Example 15 | 4 | 4 | 3 | 0.6 μm |
| Example 16 | 4 | 3 | 3 | 0.6 μm |
| Example 17 | 4 | 3 | 3 | 0.4 μm |
| Example 18 | 4 | 3 | 3 | 1.0 μm |
| Example 19 | 4 | 3 | 3 | 0.6 μm |
| Example 20 | 4 | 3 | 3 | 0.8 μm |
| Example 21 | 3 | 3 | 3 | 0.6 μm |
| Example 22 | 4 | 3 | 3 | 0.8 μm |
| Example 23 | 3 | 3 | 3 | 0.5 μm |
| Comparative Example 1 | 1 | 2 | 1 | 0.5 μm |
| Comparative Example 2 | 1 | 2 | 1 | 1.0 μm |
| Comparative Example 3 | 1 | 2 | 1 | 1.0 μm |
| Comparative Example 4 | 1 | 2 | 1 | 0.6 μm |
| Comparative Example 5 | 2 | 2 | 2 | 0.4 μm |
| Comparative Example 6 | 2 | 2 | 2 | 0.3 μm |
| Comparative Example 7 | 3 | 3 | 2 | 0.3 μm |
| Comparative Example 8 | 3 | 3 | 2 | 0.3 μm |

TABLE 3

| | |ΔV1| |
| --- | --- |
| Example 1 | 17 |
| Example 18 | 16 |
| Example 19 | 16 |
| Example 20 | 18 |
| Example 21 | 16 |
| Example 22 | 26 |

According to the present disclosure, an electrophotographic photosensitive member can be provided that has the support and the photosensitive layer formed on the support, has also the mechanical durability, and can achieve both of the suppression of the image flow and the adequate electrical characteristics. In addition, according to the present disclosure, a process cartridge and an electrophotographic apparatus can be provided that have the electrophotographic photosensitive member.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-240171, filed Dec. 21, 2018, which is hereby incorporated by reference herein in its entirety.

What is claimed is:

1. An electrophotographic photosensitive member, comprising:
a support bearing a photosensitive layer thereon, wherein a surface layer of the electrophotographic photosensitive member comprises a copolymerized product of a composition comprises (i) a hole transporting compound represented by formula (1), (ii) a compound represented by formula (3) and (iii) a compound represented by formula (4)

where $Ar^{11}$ to $Ar^{13}$ independently represent a substituted or unsubstituted phenyl group, or a substituted or unsubstituted biphenyl group, with the provisos that at least one of $Ar^{11}$ to $Ar^{13}$ is a substituted or unsubstituted biphenyl group, at least one of $Ar^{11}$ to $Ar^{13}$ has a substituent represented by formula (2), and the substituent of the substituted phenyl and substituted biphenyl group is independently an alkyl group, an alkoxy group or a group represented by formula (2)

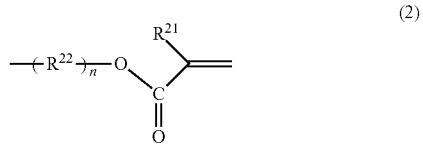

where $R^{21}$ represents a hydrogen atom or a methyl group, $R^{22}$ represents an alkylene group having 1 to 6 carbon atoms, and n represents 0 or 1;

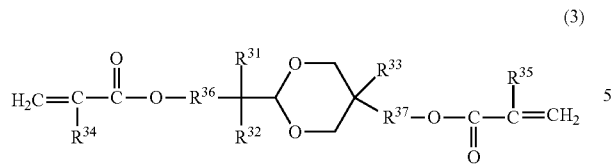

(3)

where $R^{31}$ and $R^{32}$ independently represent an alkyl group having 1 to 4 carbon atoms and may be bonded with each other to form a ring, $R^{33}$ represents an alkyl group having 1 to 4 carbon atoms, $R^{34}$ and $R^{35}$ independently represent a hydrogen atom or a methyl group, and $R^{36}$ and $R^{37}$ independently represent an alkylene group having 1 to 4 carbon atoms; and

(4)

where $Ar^{41}$ to $Ar^{43}$ independently represent a substituted or unsubstituted phenyl group, or a substituted or unsubstituted biphenyl group, with the provisos that at least one of $Ar^{41}$ to $Ar^{43}$ is a substituted or unsubstituted biphenyl group, at least one of $Ar^{41}$ to $Ar^{43}$ has a substituent represented by formula (5), and the substituent of the substituted phenyl and substituted biphenyl group is independently an alkyl group, an alkoxy group, a group represented by formula (2) or a group represented by formula (5)

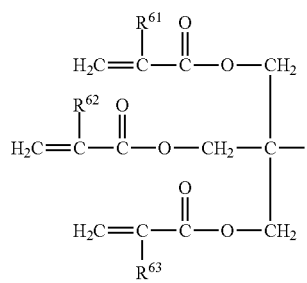

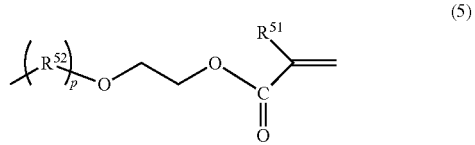

(5)

where $R^{51}$ represents a hydrogen atom or a methyl group, $R^{52}$ represents an alkylene group having 1 to 6 carbon atoms, and p represents 0 or 1.

2. The electrophotographic photosensitive member according to claim 1, wherein a content by mass of the compound represented by formula (3) in the composition is 0.1 to 1.0 times a content by mass of the hole transporting compound represented by formula (1).

3. The electrophotographic photosensitive member according to claim 1, wherein the composition further comprises a copolymerized product of a composition containing a compound represented by formula (6) or formula (7)

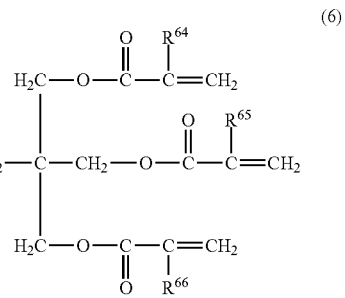

(6)

where $R^{61}$ to $R^{66}$ independently represent a hydrogen atom or a methyl group, X is a substituted or unsubstituted alkylene group, a substituted or unsubstituted cycloalkylene group, or a substituted or unsubstituted phenylene group, and the substituents are each independently an alkyl group having 1 to 3 carbon atoms, and

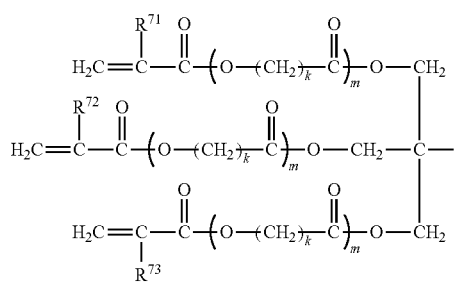

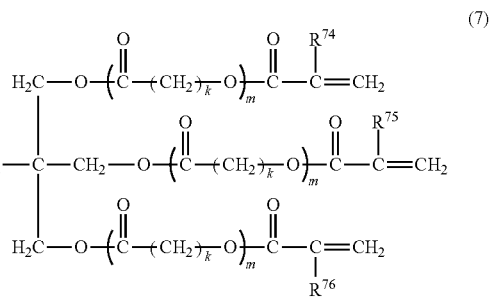

(7)

where $R^{71}$ to $R^{76}$ are a hydrogen atom or a methyl group, k represents 1 to 9, and m represents 0 or 1 to 3.

4. The electrophotographic photosensitive member according to claim 1, wherein the photosensitive layer comprises a compound represented by formula (8)

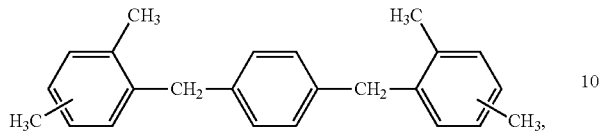
(8)

5. The electrophotographic photosensitive member according to claim 4, wherein the compound represented by formula (8) is selected from the group consisting of formulae (8-1), (8-2) and (8-3)

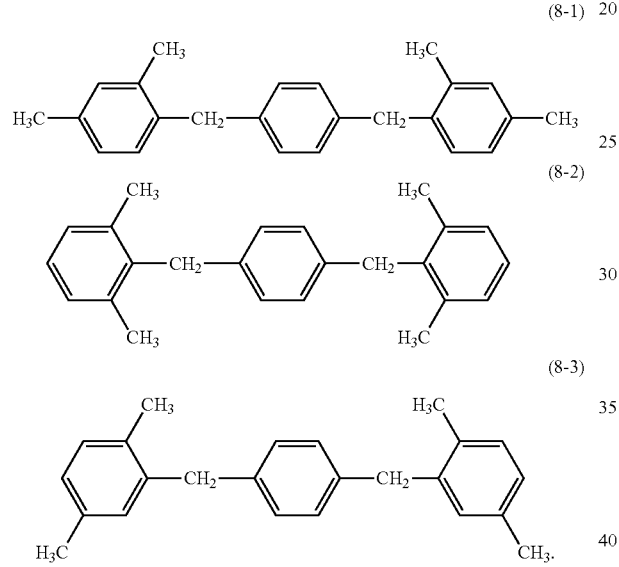
(8-1)
(8-2)
(8-3)

6. The electrophotographic photosensitive member according to claim 5, wherein the compound represented by formula (8) is represented by formula (8-1).

7. The electrophotographic photosensitive member according to claim 1, wherein $R^{31}$ and $R^{32}$ are methyl groups.

8. An electrophotographic apparatus comprising an electrophotographic photosensitive member having a support bearing a photosensitive layer thereon, a charging unit, an exposure unit, a developing unit and a transfer unit, wherein
a surface layer of the electrophotographic photosensitive member comprises a copolymerized product of a composition comprises (i) a hole transporting compound represented by formula (1), (ii) a compound represented by formula (3) and (iii) a compound represented by formula (4)

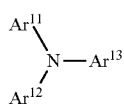
(1)

where $Ar^{11}$ to $Ar^{13}$ independently represent a substituted or unsubstituted phenyl group, or a substituted or unsubstituted biphenyl group, with the provisos that at least one of $Ar^{11}$ to $Ar^{13}$ is a substituted or unsubstituted biphenyl group, at least one of $Ar^{11}$ to $Ar^{13}$ has a substituent represented by formula (2), and the substituent of the substituted phenyl and substituted biphenyl group is independently an alkyl group, an alkoxy group or a group represented by formula (2)

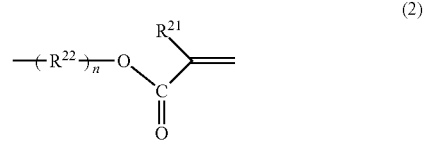
(2)

where $R^{21}$ represents a hydrogen atom or a methyl group, $R^{22}$ represents an alkylene group having 1 to 6 carbon atoms, and n represents 0 or 1;

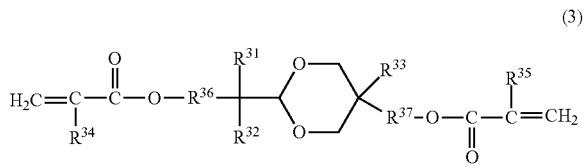
(3)

where $R^{31}$ and $R^{32}$ independently represent an alkyl group having 1 to 4 carbon atoms and may be bonded with each other to form a ring, $R^{33}$ represents an alkyl group having 1 to 4 carbon atoms, $R^{34}$ and $R^{35}$ independently represent a hydrogen atom or a methyl group, and $R^{36}$ and $R^{37}$ independently represent an alkylene group having 1 to 4 carbon atoms; and

(4)

where $Ar^{41}$ to $Ar^{43}$ independently represent a substituted or unsubstituted phenyl group, or a substituted or unsubstituted biphenyl group, with the provisos that least one of $Ar^{41}$ to $Ar^{43}$ is a substituted or unsubstituted biphenyl group, at least one of $Ar^{41}$ to $Ar^{43}$ has a substituent represented by formula (5), and the substituent of the substituted phenyl and substituted biphenyl group is independently an alkyl group, an alkoxy group, a group represented by formula (2) or a group represented by formula (5)

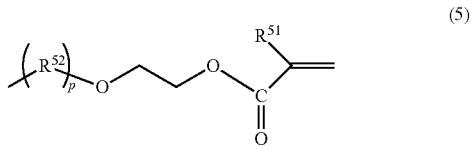
(5)

where $R^{51}$ represents a hydrogen atom or a methyl group, $R^{52}$ represents an alkylene group having 1 to 6 carbon atoms, and p represents 0 or 1.

9. A process cartridge that integrally supports an electrophotographic photosensitive member comprising a support bearing a photosensitive layer thereon, and at least one unit selected from the group consisting of a charging unit, a developing unit, a transfer unit and a cleaning unit, said process cartridge being is detachably attachable to a main body of an electrophotographic apparatus, wherein a surface layer of the electrophotographic photosensitive member comprises a copolymerized product of a composition comprises (i) a hole transporting compound represented by formula (1), (ii) a compound represented by formula (3) and (iii) a compound represented by formula (4)

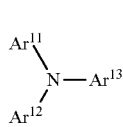
(1)

where $Ar^{11}$ to $Ar^{13}$ independently represent a substituted or unsubstituted phenyl group, or a substituted or unsubstituted biphenyl group, with the provisos that at least one of $Ar^{11}$ to $Ar^{13}$ is a substituted or unsubstituted biphenyl group, at least one of $Ar^{11}$ to $Ar^{13}$ has a substituent represented by formula (2), and the substituent of the substituted phenyl and substituted biphenyl group is independently an alkyl group, an alkoxy group or a group represented by formula (2)

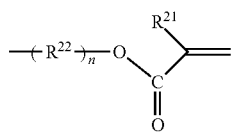
(2)

where $R^{21}$ represents a hydrogen atom or a methyl group, $R^{22}$ represents an alkylene group having 1 to 6 carbon atoms, and a represents 0 or 1;

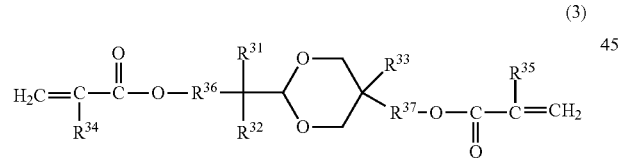
(3)

where $R^{31}$ and $R^{32}$ independently represent an alkyl group having 1 to 4 carbon atoms and may be bonded with each other to form a ring, $R^{33}$ represents an alkyl group having 1 to 4 carbon atoms, $R^{34}$ and $R^{35}$ independently represent a hydrogen atom or a methyl group, and $r^{36}$ and $R^{37}$ independently represent an alkylene group having 1 to 4 carbon atoms; and

(4)

where $Ar^{41}$ to $Ar^{43}$ independently represent a substituted or unsubstituted phenyl group, or a substituted or unsubstituted biphenyl group, with the provisos that at east one of $Ar^{41}$ to $Ar^{43}$ is a substituted or unsubstituted biphenyl group, at least one of $Ar^{41}$ to $A^{43}$ has a substituent represented by formula (5), and the substituent of the substituted phenyl and substituted biphenyl group is independently an alkyl group, an alkoxy group, a group represented by formula (2) or a group represented by formula (5)

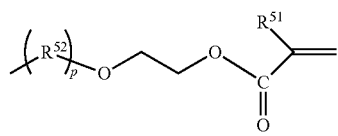
(5)

where $R^{51}$ represents a hydrogen atom or a methyl group, $R^{52}$ represents an alkylene group having 1 to 6 carbon atoms, and p represents 0 or 1.

* * * * *